(No Model.)  2 Sheets—Sheet 1.

C. C. KLEIN.
FRICTION CLUTCH.

No. 545,078. Patented Aug. 27, 1895.

WITNESS
Wm H Fegeley
Howard Rippey

INVENTOR
Chas. C. Klein (No Model.) 2 Sheets—Sheet 2.

C. C. KLEIN.
FRICTION CLUTCH.

No. 545,078. Patented Aug. 27, 1895.

WITNESS:
Wm. A. Fegeley
Howard Rippey

INVENTOR
Chas. C. Klein.

UNITED STATES PATENT OFFICE.

CHARLES C. KLEIN, OF PHILADELPHIA, PENNSYLVANIA.

FRICTION-CLUTCH.

SPECIFICATION forming part of Letters Patent No. 545,078, dated August 27, 1895.

Application filed December 11, 1894. Serial No. 531,496. (No model.)

*To all whom it may concern:*

Be it known that I, CHARLES C. KLEIN, a citizen of the United States, residing at Philadelphia, in the county of Philadelphia and State of Pennsylvania, have invented certain new and useful Improvements in Friction-Clutches and in Mechanism for Operating the Same; and I do hereby declare that the following is a full, clear, and exact description of my invention, which will enable others skilled in the art to which it appertains to make and use the same, reference being had to the accompanying drawings.

The first part of my invention relates to that class of friction-clutches in which an elastic ring is compressed upon a cylindrical head by means of levers, which latter may be operated in any convenient manner; and the objects of my invention are, first, to provide the friction-ring upon its exterior with rigid lugs, internal flanges, bosses, and other attachments for purposes herein specified; second, to use the necessary attachments to the friction-ring and pressure-levers for balancing purposes; third, to so locate the point of impact between the friction-ring and pressure-levers that the best result is attained; fourth, to relieve the main case of the clutch from strain by introducing tension-pieces.

The second part of my invention relates to improvements in the operating mechanism of friction-clutches.

The mechanism of the clutch is illustrated in the accompanying drawings, in which—

Figure 1:
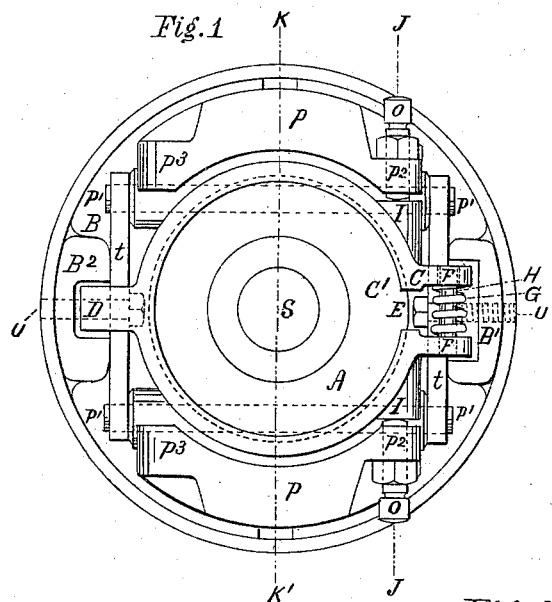
Figure 2:
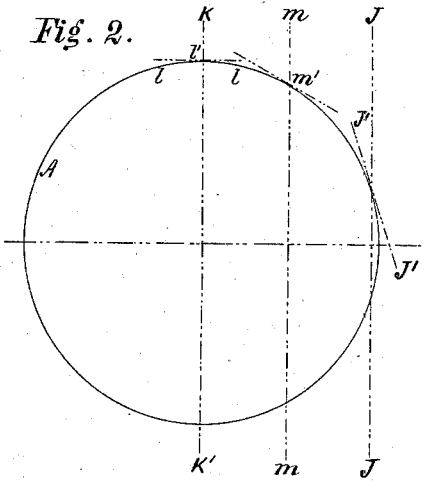
Figure 3:
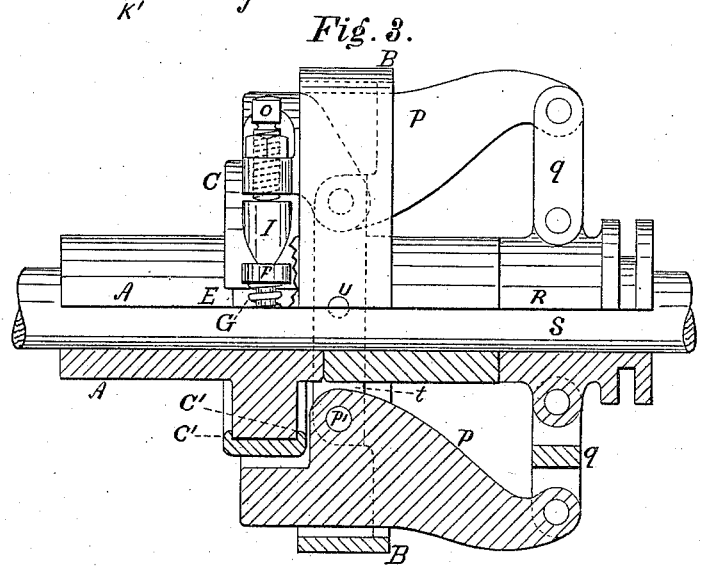
Figure 4:
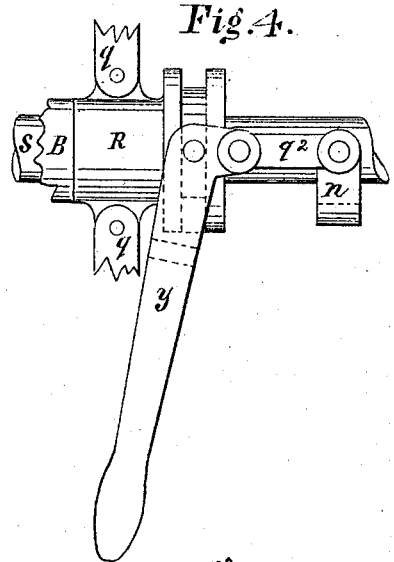
Figure 5:
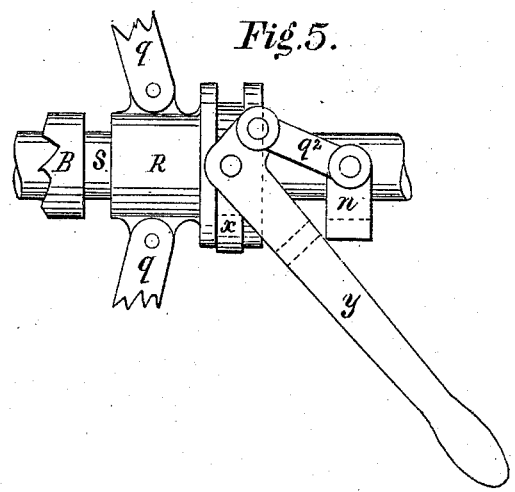
Figure 6:
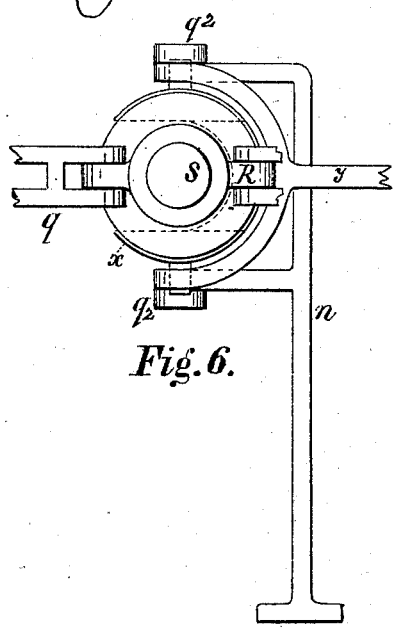
Figure 7:
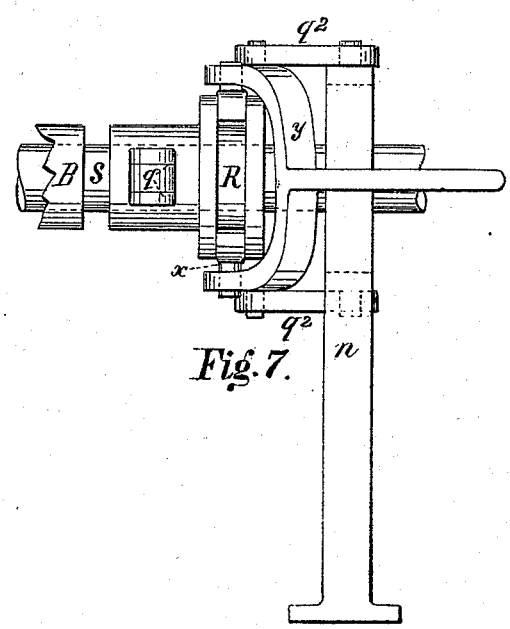

Figure 1 is an end view of the clutch. Fig. 2 is a diagram showing the effect of moving the point of impact of the pressure-levers. Fig. 3 is a side view and half a section of the clutch through the angle line U S K, Fig. 1, the lug B² being broken away to show underlying parts. Figs. 4, 5, 6, and 7 are projections showing an improved lever, links, and support for operating the clutch.

The clutch consists of the usual cylindrical head A, forming one transmitting member of the clutch, and the frame or case B, forming the other transmitting member, either one of which may be fastened to the shaft S. To engage these two members by frictional contact a contractible ring C is placed over the head A and is provided upon its exterior circumference with jaws or lugs interlocking with corresponding jaws or lugs on the interior surface of the case B. It is self-evident that the lug D may be placed upon B and the recessed lug B² on C without detracting from their efficiency.

The ring C, which is cut open at E, must be made thin enough to yield readily by its elasticity to be forced into close contact with the head A, and as it is subjected in this operation to great tensile strain the material of which it is composed must be of the greatest possible tensile strength. In order to prevent the ring C from sliding upon the head A in the direction of its axial line and to hold lubricant between the exterior frictional surface of the head A and the interior surface of the ring C, the latter is provided with internal flanges C' C', between which the head A may freely revolve. As the strains in the direction of the axis of the head A are very slight, the flanges C' C' may be made very shallow, and this fact makes it possible to "spring," in technical language, the ring C over the head A, or, in other words, by reason of the cut at E in the ring C the latter may be expanded sufficiently to allow the flanges C' C' to slip over the head A, the elasticity of the ring C being relied upon to contract it again upon the head A to a loose fit when in its proper place.

In order that the attachments forming the interlocking jaws between the exterior circumference of the ring C and the interior circumference of the case B may not throw the ring C out of balance, I provide diametrically opposite said jaws two lugs F F, which I utilize at the same time as abutments for the spring G to expand the ring C when the clutch is disengaged in case the elasticity of the ring is impaired. A pin H, screwed into one of these lugs and supported by the other lug, passes through the center of the spring G and holds the latter in position.

The ring C is provided with two bosses I I, so placed that a central line J J drawn through them will be approximately tangent to the circumference of the head A. From the diagram, Fig. 2, it will appear that if the bosses I I were so located a central line K K' through them both would also pass through the center of the head A and a tangent line *l l* drawn through the point of intersection *l'* would be at right angles with the line K K'. Hence the pressure exerted upon the friction-surfaces by a contracting force acting in the line K K' would be neither augmented nor decreased. If we, however, move the line K K' to M M we find that a tangent line drawn though the point of impact M' makes less than a right angle with the line M M, and this angle becomes more acute as the center line of the bosses approaches J J, as at J' J', and the pressure upon the friction-surfaces increases as the acuteness of the angle. If, however, the bosses I I are moved still farther, so that their central line J J falls outside of the circumference of the friction-surface of A, the elasticity of the material of the ring will destroy a large part of the effect of pressure upon the friction-surface. Hence it follows that the position of the bosses I I on the line J J or only slightly removed therefrom is the best for efficiency.

Although I prefer the construction here described, I do not confine myself to it. As the purpose of the bosses I I is only to furnish surfaces at their ends at right angles with the axial line of the pressure-screws, it follows that such surfaces could be obtained upon the exterior surface of the friction-ring by providing the same with recesses, each having one of its sides parallel with the fulcrum-shaft of the lever P, or at right angles with the axial line of the screws O O; but the location of these surfaces is a very important matter and a distinguishing feature of my invention. If we imagine three parallel horizontal planes, a central one passing longitudinally through the axis of the clutch and two adjacent ones passing through the axes of the pressure-levers, we find that these outer planes must be located at a certain distance from the central plane in order to permit the driving-shaft S and the necessary hub to be placed between them, and from an engineering point of view it is self-evident that the surfaces heretofore mentioned and upon which the pressure-screws O O impinge must coincide with the outer planes in order to avoid objectionable cross-motions, to neutralize which would necessitate additional mechanical parts and thus complicate the construction.

The pressure which compresses the ring C is obtained through set-screws O O in the levers $p$ $p$, which are preferably acted upon by toggle-links $q$ $q$, Fig. 3, the latter receiving their motion from the sleeve R, which slides longitudinally upon the shaft S and receives its motion either in the usual manner or through the improved mechanism herein described. I do not, however, confine myself to this mode of generating the pressure upon the compressible ring A, as a conical end upon the sleeve R acting directly upon the levers P P, or any other well-known device may be used to suit the different circumstances.

As the great pressure required between the friction-surfaces of the head A and the ring C reacts upon the fulcrums $p'$ $p'$ of the levers P P, it tends to force the fulcrums apart. If the bearings for these fulcrums were put directly into the case B, the latter, in order to withstand the pressure, would have to be made of an expensive material of great tensile strength, or if made of an inferior material, like cast-iron, would have to be made exceedingly heavy and clumsy. To avoid this I make the case B only strong enough to transmit the rotative force and introduce tension pieces $t$ $t$ preferably of steel, which are fastened to the case B by screws $u$ $u$, or in any convenient manner. While this method enables me to construct the case B with the least possible amount of material, it has also technical advantages by which greater accuracy and facility of construction and repairs is attained.

Both toggle-links $q$ $q$ or any other mechanical device for operating the levers P P act upon the latter diametrically opposite in a plane passing through the center of the clutch and coinciding with the line K K', but the set-screws O O in the levers, which act upon the ring C, lie outside of that plane. If the set-screw in one lever did lie on one side and the set-screw of the other lever on the other side of the plane, the clutch would be symmetric and therefore "in balance;" but as this is not the case and both set-screws are on one side of the plane K K', it follows that the clutch would be unbalanced unless a proper counterweight would be attached on the opposite side of the plane. To avoid the labor and unsightliness of attached balance-weights, I make the lever, so far as weight is concerned, symmetric on both sides of the plane K K' and utilize for that purpose the space between the friction-ring C and the rim of the case B. The bosses $P^3$ $P^3$ are made sufficiently thicker than $P^2$ $P^2$ to also counterbalance the weight of the set-screws O O and their jam-nuts. This construction has the further advantage of strengthening the fulcrum-bosses of the levers P P, which I prefer to elongate so as to bring their bearings in the tension pieces outside of the set-screws O O, as indicated in Fig. 1.

I am aware that the pressure-levers of friction-clutches have heretofore been made symmetric in regard to the line K K', but in every such case has the power either remained within the plane K K' or it has been possible to extend one lever to one side of the plane and the other lever to the other side of the plane, so that no necessity has arisen for the construction adopted in my clutch.

The second part of my invention consists of an improved mechanism for sliding the sleeve R and has for its purpose the gaining of additional pressure and of locking the clutch when "in gear." In the groove of the sleeve R a yoke $x$ is introduced, having trunnions, as usual, which have bearings in the lever y. The lever y is provided with a short arm, to which one end of the link $q^2$ is pivoted, the other end being pivoted to the stationary stand n. When the lever is in the position shown in Fig. 4, the sleeve R is close up against the case B and the clutch is in gear. When the sleeve R is in that position, the two centers of the link $q^2$ and that of the trunnions on the yoke s lie in a straight line, which is parallel with the center line of the shaft S, and therefore the links $q^2$ act as toggles, developing their greatest pressure when in that position and locking at the same time the clutch when in gear. When the lever is moved to the position shown in Fig. 5, the sleeve R moves away from B, and thereby releases the toggle-links q q and $q^2 q^2$ from pressure. It is evident that the lever y could be attached to the stand z and the links $q^2 q^2$ to the trunnions of the yoke x with the same result.

What I claim as my invention, and desire to secure by Letters Patent, is—

1. A friction ring, kept in constant positive transmitting contact with one of the transmitting members by means of interlocking jaws projecting from its exterior surface and from the interior surface of said transmitting member respectively, approximately opposite to the cut in the circumference of said ring, in combination with said transmitting member, a cylindrical head and means for compressing said ring upon the cylindrical head, substantially as and for the purpose set forth.

2. A compressible friction ring having internal flanges inclosing a cylindrical head, in combination with said cylindrical head, a transmitting member or case, pressure levers and means for operating the same, substantially as and for the purpose set forth.

3. A friction ring kept in constant positive transmitting contact with one of the transmitting members by means of interlocking jaws projecting from its exterior surface and from the interior surface of said transmitting member respectively and having diametrically opposite said jaws counterbalancing lugs, in combination with a cylindrical head, a transmitting member or case, pressure levers and means for operating the same substantially as and for the purpose set forth.

4. A friction ring having surfaces at approximately right angles to the axial line of impinging pressure screws and approximately coinciding with a plane parallel with the axis of the shaft and passing through the axis of the pressure levers, in combination with a cylindrical head, pressure levers, pressure screws in said pressure levers, impinging upon said surfaces means for operating said pressure levers, and a transmitting member supporting said pressure levers, substantially as and for the purpose set forth.

5. In a friction clutch pressure levers acting in a plane passing longitudinally through the center of the clutch, adjusting pressure screws located on both levers to one side of that plane and corresponding with and acting upon surfaces provided upon the friction ring, counterbalancing extensions of said levers on the opposite side of said plane, combined with a compressible friction ring, a fast and a loose transmitting member and means for actuating said levers substantially as and for the purpose set forth.

6. In a friction clutch, tension pieces connecting the bearings for the fulcrum journals of the pressure levers and attached to the transmitting member which supports said pressure levers in combination with said transmitting member, a friction ring, a cylindrical head, pressure levers and means for actuating said pressure levers substantially as and for the purpose set forth.

7. In a friction clutch the improved actuating mechanism consisting of a trunnioned yoke a rigid stand or support, toggle links, an operating lever connecting said yoke and support, and a sliding sleeve, in combination with the transmitting members of a friction clutch, a friction ring, pressure levers and the means for operating said levers, substantially as and for the purpose set forth.

CHARLES C. KLEIN.

Witnesses:
WILLIAM H. KENNEDY,
S. HOWARD RIPPEY.